United States Patent
Kim et al.

(10) Patent No.: US 6,627,238 B1
(45) Date of Patent: *Sep. 30, 2003

(54) BROWNING COMPOSITION

(75) Inventors: Hyung W. Kim, Irvington, NY (US); Dharam V. Vadehra, New Milford, CT (US); Elaine R. Wedral, Sherman, CT (US)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1030 days.

(21) Appl. No.: 08/709,963

(22) Filed: Sep. 9, 1996

(30) Foreign Application Priority Data

Oct. 19, 1995 (EP) .............................. 95202832

(51) Int. Cl.⁷ ................................ A21D 10/00
(52) U.S. Cl. ........................ 426/94; 426/243; 426/250; 426/302; 426/305; 426/540
(58) Field of Search .......................... 426/94, 243, 250, 426/262, 249, 540, 302, 305, 601, 602

(56) References Cited

U.S. PATENT DOCUMENTS

| 4,886,659 A | | 12/1989 | Baines et al. .................. 424/63 |
| 4,913,919 A | * | 4/1990 | Cornwell et al. ........... 426/302 |
| 5,108,770 A | | 4/1992 | Domingues et al. .......... 426/94 |
| 5,118,514 A | * | 6/1992 | Adams et al. ................. 426/94 |
| 5,139,800 A | * | 8/1992 | Anderson et al. ........... 426/250 |
| 5,196,219 A | * | 3/1993 | Hsu et al. .................... 426/243 |

FOREIGN PATENT DOCUMENTS

| EP | 0 542 510 A1 | 5/1993 |
| GB | 2 228 662 A | 9/1990 |

OTHER PUBLICATIONS

Owen R. Fennema, "Food Chemistry", pp. 630–631, 1985.*

* cited by examiner

*Primary Examiner*—Lien Tran
(74) *Attorney, Agent, or Firm*—Winston & Strawn LLP

(57) ABSTRACT

A browning composition for food having a dough crust. This composition includes a caramel color and a thickening agent, and undergoes browning reactions upon microwave or conventional heating.

15 Claims, No Drawings

BROWNING COMPOSITION

FIELD OF THE INVENTION

This invention relates to a browning composition for foods having a dough crust. More particularly, the invention relates to a coating composition for foods having a pastry crust which undergoes browning reactions upon microwave or conventional heating to provide cooked products having a desirable browned crust.

BACKGROUND OF THE INVENTION

The usage of microwave ovens in homes has increased significantly in recent years and continues to increase. While microwave cooking of foods affords a significant time saving over conventional convection oven cooking, it suffers from the disadvantage that foods cooked by microwave energy lack the desired degree of surface browning that foods, particularly those having a dough crust such as meat pies and fruit pies, have when cooked in a conventional oven.

The most common reaction responsible for surface browning during cooking of products having a dough crust is the well-known Maillard reaction (non enzymatic browning) between naturally occurring reducing sugars and compounds containing an amino group, e.g. amino acids, peptides and proteins, which results in the formation of colored melanoidins. The rate at which the Maillard reaction proceeds to form the colored pigments increases markedly with temperature. When foods containing a dough crust, such as frozen pies, are heated in a conventional oven, the crust is heated to considerably higher temperatures than the interior of the pie, with the high surface temperatures being sufficient to achieve browning. However, in microwave heating the heat energy is released internally within the food so that the surface remains at a relatively even temperature with the interior. Consequently the high surface temperatures necessary to achieve browning are not reached within the time required to bake the pie.

A number of compositions have been proposed heretofore to create a browned surface on foods heated by microwave energy. However, none of these prior compositions has been entirely satisfactory due to flavor concerns, cost, ineffectiveness, difficulty of use, and other problems.

SUMMARY OF THE INVENTION

According to the present invention, there is provided a browning composition comprising a caramel color and a thickening agent.

The preferred thickening agent is a modified starch and the caramel color is generally provided by a melanoidine. When the disclosed amounts and ratios of these additives are included in a dough crust and subjected to heating, the surface of the dough crust easily develops a browned surface condition without experiencing the difficulties of the prior art.

DETAILED DESCRIPTION OF THE INVENTION

The pH of the browning composition is preferably less than 7 e.g. from 3 to 5.

The caramel color may be ordinary caramel colour or it may advantageously be a caramel color replacement. Examples of caramel color replacements are brown compounds which, based on limited solubility in both organic and aqueous solvents, appear to be classical melanoidines of unknown structure having an average molecular weight range of from 1 to 10 kDal. The melanoidines may be prepared by reacting a reducing sugar with a compound containing free amino groups such as an amino acid, peptide or protein. The sugar may be a currently available raw material such as glucose, fructose, galactose, lactose, dextrose (e.g. from corn syrup) or maltose. The compound containing free amino groups may be, for instance, ammonia, a hydrolysed plant protein, a yeast derivative such as a yeast autolysate or yeast extract, an oil cake of peanut or soya, gluten, casein or proteins of microorganisms.

The thickening agent may be for example a modified starch, a polysaccharide or a hydrocolloid gum such as carrageenan, locust bean, alginate or guar gum. Preferably, the thickening agent is also a stabiliser for storage at low pH, especially storage in a freezer and improves the freeze-thaw stability. The thickening agent helps to retain the browning composition on the surface of the dough crust when applied.

The ratio of caramel colour to the thickening agent may be from 5:100 to 100:100 and preferably from 10:100 to 50:100 by weight.

The browning composition may be used in the form of an aqueous emulsion or as a dry powder e.g. formed by spray drying or freeze-drying the emulsion.

When the browning composition is used in the form of an aqueous emulsion, the amount of caramel color is conveniently from 1 to 25%, preferably from about 2.5 to 20% and especially from about 5 to 15% by weight based on the total weight of the browning emulsion. The amount of water in the emulsion may be from about 50 to 90% by weight based on the total weight of the browning composition.

Advantageously an edible oil is present in the browning composition to aid heat transfer. Examples of oils are corn oil, soy oil, safflower oil, cottonseed oil and sunflower oil. The amount of oil present in the composition is advantageously 5 to 50 times the amount of caramel colour. An emulsion of the browning agent may contain from 5 to 50% by weight of edible oil based on the total weight of the emulsion. The presence of an edible oil may provide enhanced browning of the dough crust on microwave heating.

Other ingredients which may be present in the composition include food grade acids to provide acidity and give a longer shelf life, sugared egg yolk, a flavor such as paprika, or hydrolysed plant proteins.

The present invention also provides a process for treating a food product having a dough crust to render the crust brownable upon heating in a conventional or microwave oven which comprises applying to the surface of the dough crust an amount of a browning composition comprising a caramel color and a thickening agent effective to develop a browned surface on the crust when heated in a conventional or microwave oven.

The browning composition can be conveniently coated, such as by brushing, spraying, and the like onto the surface of a previously formed dough crust of a food to be baked, such as a meat pie or fruit pie. Satisfactory results are obtained when the composition is coated onto the surface of the dough crust in an amount of about 0.008 to 0.02 gm/sq. cm. The crust may be formed of any of the well known dough materials conventionally used in the preparation of crusts for frozen pies, such as flour, water, fat or shortening, as well as conventional additives for modifying flavor and/or texture. The coating composition may be applied to the dough crust at the time the pie is prepared after which the resulting product is frozen and maintained in a frozen state until baking. Alternatively, the coating composition may be applied to the dough surface after the pie has been frozen.

The food product having the dough crust which has been coated with the composition of this invention may be baked in a microwave oven utilizing conventional time-temperature relationships which will vary depending on the nature and size of the product. During microwave heating, the surface of the dough crust undergoes a browning reaction to provide a baked crust having a desirable golden brown appearance substantially the same as that obtained by baking the food product in a conventional convection oven.

EXAMPLES

The following Examples further illustrate the present invention. Parts are given by weight.

Examples 1 to 3

The ingredients listed in the following Table 1 were blended well by shear mixing to make a good emulsion of a browning agent having a pH of 4.3.

TABLE 1

| Ingredients | Ex. 1 | Ex. 2 | Ex. 3 |
| --- | --- | --- | --- |
| Water | 550 | 550 | 550 |
| Soy oil | 250 | 250 | 250 |
| Sugared egg yolk | 10 | 10 | 10 |
| Acetic acid | 0.86 | 0.86 | 0.86 |
| Modified starch* | 23 | 23 | 23 |
| Caramel color | 6.25 | 9.0 | 10.4 |
| Aqua Resin Paprika | 0.6 | 0.6 | 0.73 |

*Mira Thik 468, Staley 2 g of each emulsion were sprayed onto frozen 300 g chicken pies the crusts of which developed an attractive brown color when heated in either a microwave or a conventional oven. Frozen chicken pies coated with the browning agent had a good shelf life.

Examples 4 to 6

The procedures of Examples 1 to 3 were repeated but using instead of the caramel color, a caramel color replacement having the constitution shown in the following Table 2:

TABLE II

| Ingredients | Parts |
| --- | --- |
| Glucose | 10 |
| Protein | 10 |
| NH$_4$Cl | 5.5 |
| NaCl | 2.5 |
| Melanoidine* | 30 |
| Water | to 100 |

*A compound formed by the reaction of glucose and ammonia having a molecular weight distribution of 2-5 kDa (~5%) and 1-2 kDa (~5%) based on gel filtration chromatography.

2 g of each emulsion were brushed onto frozen 300 g chicken pies. Some chicken pies were heated in a conventional oven at 205° C for 35 minutes and the crusts developed a very attractive golden brown color. The remainder of the chicken pies were heated at high power in a 700 watt microwave oven for 10 minutes whereupon the crusts developed a very attractive golden brown color even stronger than that of the crusts of the chicken pies heated in a conventional oven.

What is claimed is:

1. A browning composition comprising an aqueous emulsion of a caramel color and a thickening agent wherein the caramel color is present in an amount of about 2.5 to 25% by weight, the thickening agent is present in an amount of at least about 2.5%, with the caramel color and thickening agent being present at a weight ratio of between 5:100 and 100:100, and the browning composition does not impart a browned surface color to a food product to which it is applied until heated in a conventional or microwave oven.

2. A browning composition according to claim 1 whose pH is less than 7.

3. A browning composition according to claim 1 wherein the caramel color is provided by melanoidine.

4. A browning composition according to claim 1 wherein the thickening agent is also a stabiliser for storage at low pH.

5. A browning composition according to claim 1 wherein the ratio of caramel color to the thickening agent is from 10:100 to 50:100.

6. A browning composition according to claim 1 wherein an edible oil is present.

7. A browning composition according to claim 6 wherein the amount of edible oil is from 5 to 50 times the amount of caramel color.

8. A browning composition according to claim 1 wherein a hydrolysed plant protein is present.

9. A process for treating a food product having a dough crust to render the crust brownable upon heating in a conventional or microwave oven, which process comprises applying to a surface of the dough crust an amount of a browning composition sufficient to develop a browned surface on the crust when heated in a conventional or microwave oven, said browning composition comprising an emulsion of a caramel color and a thickening agent wherein the caramel color is present in an amount of about 2.5 to 25% by weight, the thickening agent is present in an amount of at least about 2.5%, with the caramel color and thickening agent being present at a ratio of between 5:100 and 100:100 by weight, and heating the dough crust and browning agent in a conventional or microwave oven in order to develop the browned surface on the crust.

10. A process according to claim 9 wherein the browning composition is applied onto the surface of the dough crust in an amount of from about 0.008 to 0.02 g/ sq.cm.

11. A food comprising a dough crust and a coating of the browning composition of claim 1.

12. The food of claim 11 wherein the browning composition is present in an amount of from about 0.008 to 0.02 g/sq.cm.

13. The browning composition of claim 2, wherein the pH of the composition is 3 to 5.

14. A browning composition in the form of an emulsion comprising a thickening agent, and a caramel-colored colorant, wherein the caramel-colored colorant and thickening agent are present at a weight ratio of between 5:100 and 100:100, and the amount of thickening agent is at least 2.5 percent by weight of the composition.

15. A browning composition in the form of an emulsion comprising:

a caramel color in an amount of about 2.5 to 25% by weight;

a thickening agent in an amount of at least about 2.5% to thicken the composition, wherein the ratio of amount of caramel color to thickening agent is from about 5:100 to 100:100;

an oil in an amount sufficient to aid heat transfer in the composition and being 5 to 50 times the amount of the caramel color; and water in an amount of about 50 to 90% by weight.

* * * * *